United States Patent
Hansen

(10) Patent No.: US 6,913,314 B2
(45) Date of Patent: Jul. 5, 2005

(54) SAFETY SEAT WITH DEVICE FOR AUTOMATICALLY PUTTING A BELT ON AND TAKING IT OFF

(75) Inventor: Holger Hansen, Hamburg (DE)

(73) Assignee: Autoflug GmbH (DE)

( * ) Notice: Subject to any disclaimer, the term of this patent is extended or adjusted under 35 U.S.C. 154(b) by 99 days.

(21) Appl. No.: 10/663,111

(22) Filed: Sep. 16, 2003

(65) Prior Publication Data

US 2004/0084953 A1 May 6, 2004

(30) Foreign Application Priority Data

Sep. 16, 2002 (DE) .......................................... 102 43 075

(51) Int. Cl.$^7$ .............................................. B64D 25/04
(52) U.S. Cl. ............................... 297/216.1; 244/122 R; 297/277; 297/484; 297/479
(58) Field of Search ........................ 297/216.1, 216.13, 297/277, 280, 281, 479, 484; 244/122 R

(56) References Cited

U.S. PATENT DOCUMENTS

| 2,556,076 | A | * | 6/1951 | Evans et al. ............ 244/122 R |
| 2,829,702 | A | * | 4/1958 | Keating ................... 244/122 R |
| 3,314,720 | A | * | 4/1967 | Millington et al. ...... 297/216.1 |
| 3,868,143 | A |   | 2/1975 | Reilly |
| 4,005,765 | A | * | 2/1977 | Reilly ...................... 297/216.1 |
| 4,474,347 | A | * | 10/1984 | Mazelsky ............... 244/122 R |

FOREIGN PATENT DOCUMENTS

DE           43 03 719           8/1994

* cited by examiner

Primary Examiner—Peter R. Brown
(74) Attorney, Agent, or Firm—Robert W Becker & Associates; Robert W Becker

(57) ABSTRACT

A safety seat for land, air and sea vehicles is provided. The safety seat has a safety belt harness and can be secured between the floor and ceiling of a vehicle via securement straps provided above and below the seat. The safety belt harness comprises two lap belts and two shoulder belts that extend from the lap belts. Also provided is an activating device that, as an extension of the shoulder belts, is guided below a seat portion to the entry region thereof. A respective tensioning strap is yieldingly disposed between the shoulder belts and the front securement straps.

15 Claims, 2 Drawing Sheets

SAFETY SEAT WITH DEVICE FOR AUTOMATICALLY PUTTING A BELT ON AND TAKING IT OFF

BACKGROUND OF THE INVENTION

The present invention relates to a safety seat, for land, air and sea vehicles, having at least one seat portion and one back rest, wherein the safety seat can be secured in the vehicle, between the floor and the ceiling area thereof, by means of securement straps that are provided above and below the seat, and wherein the safety seat is provided with a safety belt harness for securing the occupant that is sitting on the safety seat.

A safety seat having the aforementioned features is known from DE 43 03 719 A1; the safety seat is embodied as a fabric or textile shell that surrounds not only the back of the occupant's body but also the sides, and which has an entry portion. To secure the occupant sitting in the safety seat, a safety belt harness is provided that closes off the entry region and is comprised of four individual safety belts that are combined in a central belt buckle.

The known safety seat has the drawback that the putting-on of the safety belt harness is complicated, since a plurality of belts must be hooked into the central belt buckle. Furthermore, when the belts are taken off they rest in the textile shell, so that when the occupant enters the seat, he or she may sit upon the belts and can then grasp them only with difficulty for the strapping-in process. This is particularly significant if the safety seat is to be used in military vehicles, because in this case the occupant is frequently burdened with cumbersome clothing and equipment, thus significantly limiting the freedom of movement of the occupant after entry into the safety seat.

It is therefore an object of the present invention to provide a safety seat having the aforementioned features, according to which the freedom of movement of an occupant is increased, and in particular putting-on and taking-off of the safety belt harness is simplified.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 2:
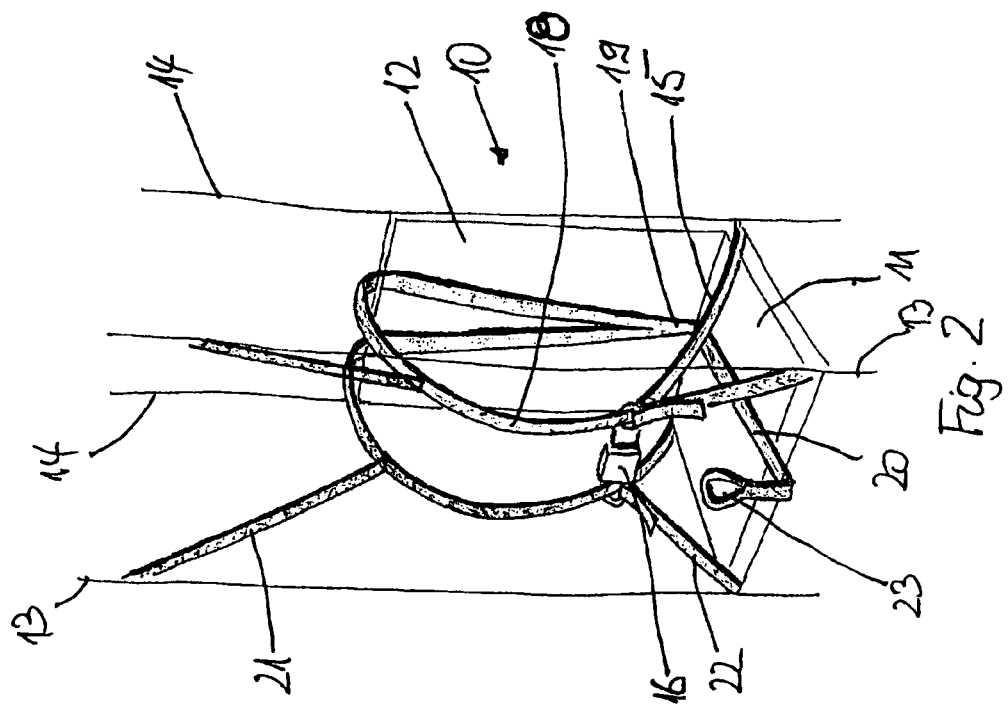
FIG. 2 shows the safety seat with the safety belt harness illustrated in the strapped-on position.

The basic concept of the present invention is that the safety belt harness comprises two lap belts that are each secured laterally of the seat portion and can be connected to one another by means of a belt buckle comprising a buckle body and an insertion tongue, as well as two shoulder belts that extend from the lap belts and are adapted to extend over the shoulders of the occupant, and an activating means that, as an extension of the shoulder belts, is guided below the seat portion to the entry region thereof; respective tensioning straps are yieldingly disposed between the shoulder belts, and front ones of the securement straps that extend on both sides of the entry region of the safety seat, in such a way that when the safety belt harness is not strapped on, the shoulder straps are held, under prestress, in an orientation that is parallel to the front securement straps.

The present invention has the advantage that due to the configuration of the safety belt harness with respectively two lap belts as well as two shoulder belts a lateral support as with the state of the art is no longer necessarily required, and the safety seat is reduced to a design having a seat portion and a back rest, whereby the safety seat is still secured in the vehicle with securement straps that are disposed in the front entry region and in the rear back rest region respectively above and below the safety seat. Since when the safety belt harness is taken off the shoulder straps are held by the tensioning straps in an orientation that extends parallel to the upper, front securement straps of the safety seat, and due to the connection of the shoulder belts with the lap belts also the lap belts are held in a plane that is disposed laterally of the seat portion, the entry region for the safety seat is left free, thus precluding the occupant from sitting upon parts of the safety belt harness upon entry. To strap the harness on, the occupant need only grasp the parts of the belt buckle held on the front securement straps and join them together in front of his or her body, as a result of which on the one hand when the belt buckle is closed the lap belts are disposed in front of the occupant's body, and on the other hand also the shoulder straps that are connected with the lap belts automatically position themselves accompanied by yielding of the tensioning straps. The shoulder belts are tightened by the furthermore provided activating means that end in front of the occupant in the entry region.

Pursuant to one embodiment of the invention, in the region of the back rest of the safety seat the shoulder straps are combined to form a central back belt, and the activating means, which is embodied as an activating belt, is connected with the back belt.

With regard to a better adaptation of the safety belt harness to the proportions of an occupant, pursuant to one embodiment of the invention, the buckle body and the insertion tongue of the belt buckle secured to the ends of the lap belts are respectively connected with the seat portion of the safety seat by means of an adjustment strap, the length of which can be altered; by adjusting the adjustment straps after the safety belt harness has been strapped on, the position of the belt buckle in front of the body of the occupant can be corrected, thus adapting the position of the individual components of the safety belt harness to the body of the occupant.

Pursuant to a first embodiment of the invention, the tensioning straps are made of a resiliently yielding material, and their ends are respectively fixedly secured to the securement straps and the shoulder belts, whereby pursuant to one embodiment the tensioning straps are preferably made of rubber.

With regard to the arresting of the activating belt after tightening of the shoulder belts, pursuant to one embodiment of the invention a releasable securing device is disposed on the seat portion in the entry region for fixing the activating belt in position.

Alternatively, the tensioning straps can be secured to the shoulder belts and, via belt deflection means disposed on the front and rear securement straps of the safety seat, can be guided to an automatic tensioning device disposed in the region of the back rest. In a similar manner, the shoulder belts or the rear belt can be connected to a tensioning device disposed in the region of the back rest. To the extent that with this embodiment of the invention an automatic tensioning device is provided, this tensioning device can be embodied as a known belt reel-in device that is provided with a winding spring as well as with a reversible blocking mechanism.

Pursuant to one embodiment of the invention, the activating means engages both belt reel-in devices in such a way that a respective oppositely directed rotational movement of the belt reel-in shafts is activated; this ensures that by an unwinding from the associated belt reel-in device, the tensioning straps, which are connected with the shoulder belts, are lengthened by the amount in which the shoulder belts are tightened. In this connection, it can be provided that the belt reel-in devices are coupled with one another via a common shaft that the activating means engages, whereby mechanisms are known that despite a central shaft permit an oppositely directed rotational movement within the belt reel-in devices.

Pursuant to one embodiment of the invention, the activating means is embodied as an activating belt that engages the central shaft of the belt reel-in devices and that in turn can be wound onto the central shaft.

Alternatively, an appropriately designed activating means can engage the blocking mechanism of the belt reel-in devices and, by activation of the blocking mechanism, can respectively introduce or release the winding movement or the unwinding movement, respectively under the effect of associating springs. In this connection, it can be provided that the activating means be embodied as a Bowden cable having a switch lever disposed on the seat portion so that by activating the switch lever, the tensioning of the shoulder belts including the release of the tensioning straps, or the release of the shoulder belts including the tightening of the tensioning straps, can be initiated.

It should be noted that the present invention is not limited to a safety seat having a seat portion and a back rest, but rather the invention can also be used with a design of the safety seat as a textile shell as known from the aforementioned DE 43 03 719 A1.

Further specific features of the present invention will be described in detail subsequently.

DESCRIPTION OF PREFERRED EMBODIMENTS

Referring now to the drawings in detail, the safety seat 10 illustrated in each of the figures comprises a seat portion 11 and a back rest 12, whereby front securement straps 13 engage the seat portion in the front entry region thereof above and below the seat portion 11, and respective rear securement straps 14 engage the upper and lower ends of the back rest 12; with these front and rear securement straps, the safety seat 10 can be secured in a non-illustrated land, air or sea vehicle.

The safety belt harness, which is provided for securing an occupant that is sitting on the safety seat, primarily comprises two lap belts 15, one end of which, to the side of the seat portion 11, and in the region of the connection to the back rest 12, is either secured to the vehicle or to the seat portion itself. Secured to the free ends of the lap belts 15 are, on the one hand, a buckle body 16 and, on the other hand, an insertion tongue 17, whereby connection of the insertion tongue 17 and the buckle body 16 forms a belt buckle by means of which the lap belts 15 can be closed in front of the body of the occupant.

Figure 1:
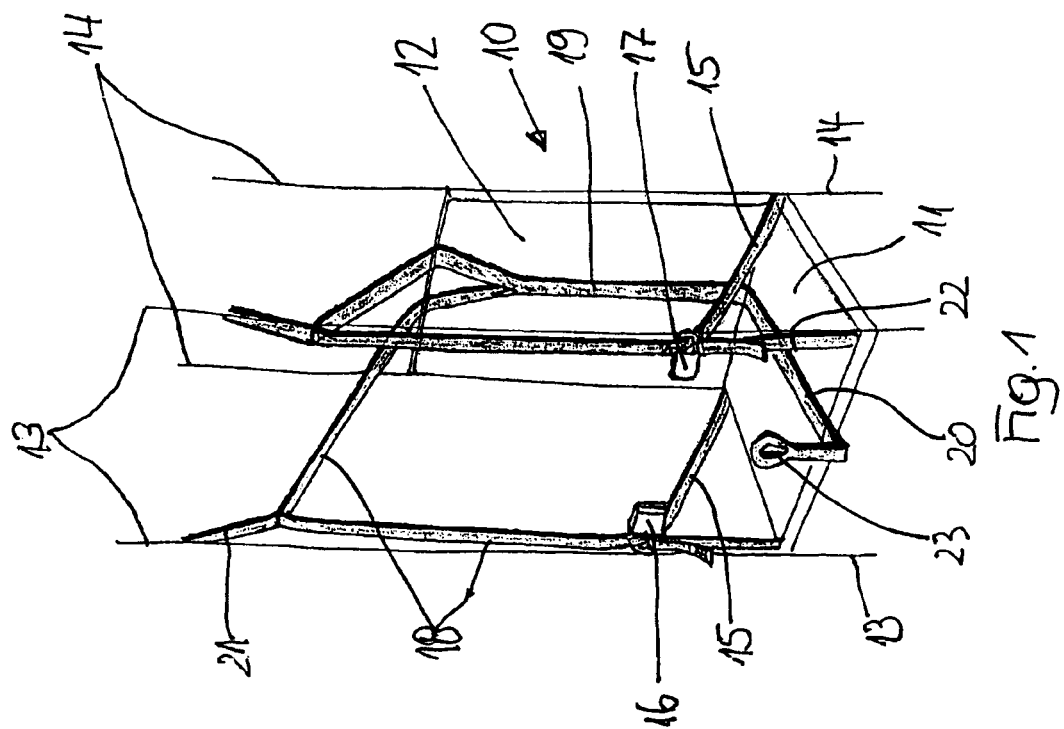
FIG. 1 shows a safety seat with the safety belt harness in the taken-off position.

Secured to the lap belts 15, or to the buckle body 16 and the insertion tongue 17, are two shoulder belts 18 which, from their connection to the lap belts 15, are guided over the shoulders of the occupant to the back rest 12, which they span from the outside; in the illustrated embodiment, the two shoulder belts 18 are joined together in a common back belt 19 that merges into an activating belt 20 as an activating means, that is guided below the seat portion 11 toward the front to the entry region of the safety seat 10. Disposed on the free end of the activating belt 20 is a hand loop 23. Although not illustrated in detail, a clamping or securement device is disposed in the front region of the seat portion 11 through which the activating belt 20 is guided. This securement device makes it possible, after the actuation of the activating or arresting belt 20 for tensioning the shoulder belts 18, to fix the arresting belt 20 in position and hence to maintain the tension in the shoulder belts 18. To release the activating belt, the securement device can be appropriately disengaged. Disposed between the respective shoulder belt 18 and the associated, lateral, front securement strap 13 is a respective fixing or tensioning strap 21 that is made of an elastic material, preferably rubber. The ends of the tensioning strap 21, in the embodiment illustrated in FIGS. 1 and 2, are respectively securely connected with the front, upper securement straps 13 and the shoulder belts 18. Furthermore, a respective adjustment strap 22 extends from the lap belts 15, or from the buckle body 16 and the insertion tongue 17, to the front entry region of the seat portion 11.

As can be seen from a comparison of FIGS. 1 and 2, to put the belt harness on one proceeds as follows: the occupant seats himself or herself in the safety seat 10, with the safety belt harness disposed as in FIG. 1. To buckle up, the occupant grasps the components of the safety belt buckle, namely the buckle body 16 and the insertion tongue 17, which are disposed to the side in front of him or her and that by the effect of the tensioning straps 21 are disposed on the front securement straps 13, and closes the buckle by inserting the tongue 17 into the buckle body 16. To the extent that by this movement the shoulder belts 18 are guided inwardly, the occupant places his or her arms through the thereby formed loops of the shoulder straps 18 and subsequently pulls on the activating belt 20 by grasping the hand loop 23 disposed in front of him or her. This tensioning movement tightens the shoulder belts 18, and in particular against the effect of the elastic tensioning straps 21. If the shoulder straps 18 are sufficiently tensioned, the activating belt 20 is fixed in position in the non-illustrated securing device. Subsequently, by tightening the adjustment straps 22, the position of the belt buckle can be corrected. Thus, with few manipulations, the strapped-in state of the safety belt harness visible in FIG. 2 can be realized.

To take the safety belt harness off, the occupant releases the activating belt 20 from the securing device and thus disengages the back belt 19 having the connected shoulder belts 18. Subsequently, the occupant opens the belt buckle, and the lap belt 15 as well as the shoulder belts 18 are again brought into the starting position of FIG. 1 by the tensioning straps 21, which are under prestress; in this starting position, the safety belt harness is ready for the next buckling-up procedure.

Figure 4:
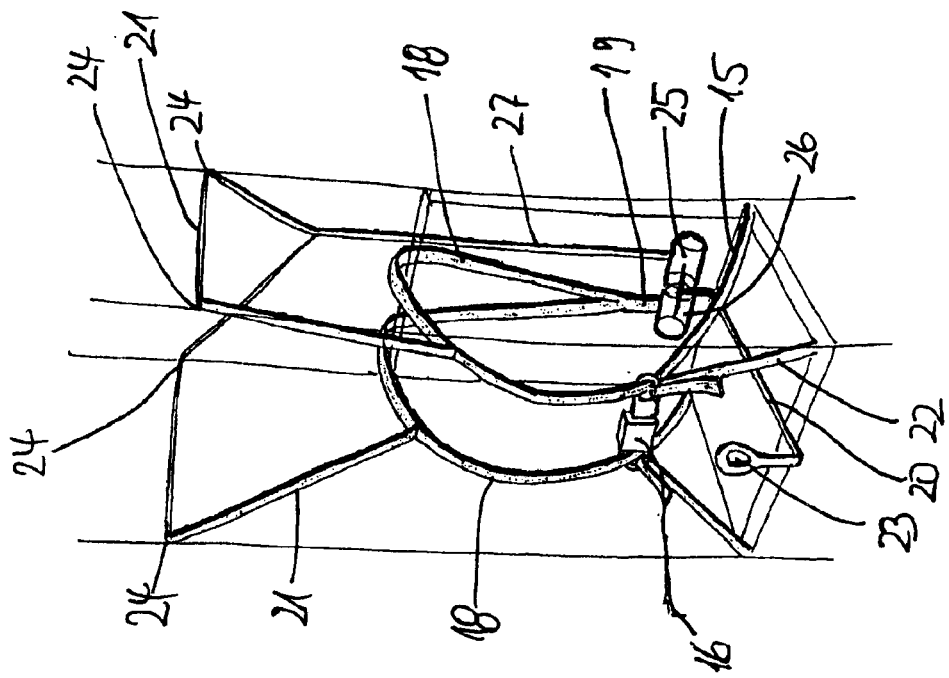
FIG. 4 shows the safety seat of FIG. 3 with the safety belt harness in the snapped-in position.
Figure 3:
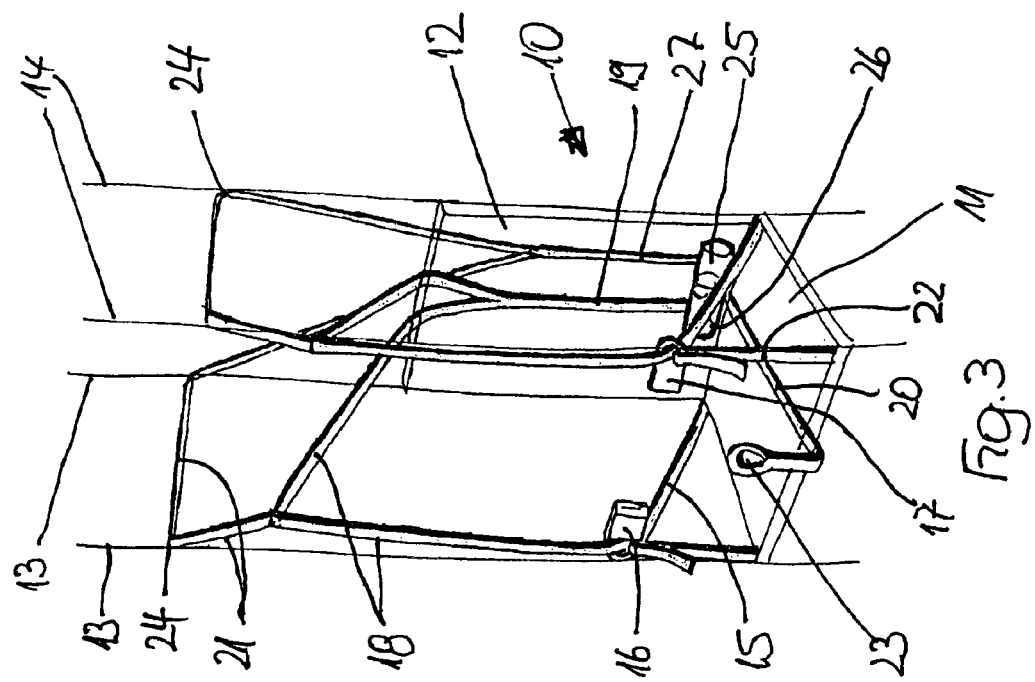
FIG. 3 shows the safety seat of FIG. 1 in another embodiment with automatic tensioning devices for tensioning and shoulder belts, with the safety belt harness in the taken-off position.

The embodiment illustrated in FIGS. 3 and 4 differs from the previous embodiment illustrated in FIGS. 1 and 2 in that the tensioning straps 21 connected to the respective shoulder belts 18, from their securement to the shoulder belts, are guided over belt deflection means 24, which are respectively disposed on the front upper securement straps 13 and the upper rear securement straps 14, to a tensioning device, which is in the form of a known belt reel-in device 25, and which is disposed in the region of the back rest 12; the tensioning straps 21, prior to entry into the belt reel-in device 25, are joined together to form a central belt portion 27. In the same manner, the back belt 19, which is connected with the shoulder belts 18, is also guided to a belt-reel device 26, which is in the form of a tensioning device and is disposed in the region of the back rest, so that not only the tensioning straps 21 but also the shoulder straps 18 are under the effect of winding springs disposed in the belt-reel devices 25, 26, and the non-strapped-in position of the safety belt harness illustrated in FIG. 3 is brought about by the retraction action of the belt-reel devices 25, 26, while the strapping-in movement up to the strapped-in state illustrated in FIG. 4 is effected against the action of the belt-reel devices 25, 26, i.e. of the winding springs disposed therein. Formed in the belt-reel devices 25, 26 are blocking mechanisms, which can be controlled or switched in a known manner, for fixing the respective wound-up belt sections of the back belt 19 and the central belt portion 27 of the tensioning straps 21 in position.

In the embodiment illustrated in FIGS. 3 and 4, the snapping-in process in accomplished in the same manner as described in connection with FIGS. 1 and 2, whereby with the joining together of the lap belts 15 with the shoulder belts 18, the yielding of the tensioning straps 21 is ensured by unwinding the central belt portion from the associated belt-reel device 25. After the lap belts 15 have been put on, the activating means, which in the illustrated embodiment is embodied as an activating belt 20, is activated, as a result of which the belt reel-in device 26 that is associated with the shoulder belts 18 is disengaged, so that the shoulder belts 18 tighten. In conformity with the tightening of the shoulder belts, the belt reel-in device 25 that is associated with the tensioning straps 21 releases the required amount of belt length.

For taking the safety belt harness off, the activating belt 20 is again activated and reverses the blocking mechanism of the belt-reel devices 25, 26 such that now, after the release of the belt buckle connection, the belt reel-in device 25 draws the central belt portion 27 in and hence tightens the tensioning straps 21, which thereby again bring the shoulder straps 18 into the starting position illustrated in FIG. 3; the lengthening of the shoulder straps 18 required for this is ensured by an appropriate unwinding movement from the belt reel-in device 26 that is associated with the shoulder straps 18.

The specification incorporates by reference the disclosure of priority document DE 102 43 075.6 of Sep. 16, 2002.

The present invention is, of course, in no way restricted to the specific disclosure of the specification and drawings, but also encompasses any modifications within the scope of the appended claims.

What I claim is:

1. A safety seat, for land, air and sea vehicles, having at least one seat portion and one back rest, wherein said safety seat is adapted to be secured to a vehicle, between a floor and ceiling area thereof, by means of securement straps provided above and below the seat, said safety seat further comprising:
    a safety belt harness for securing an occupant that is sitting on said safety seat, said belt harness in turn comprising:
        two lap belts that are each secured laterally of said at least one seat portion and can be connected to one another by a belt buckle comprising a buckle body and an insertion tongue;
        two shoulder belts that extend from said lap belts and are adapted to extend over shoulders of an occupant;
        an activating means that, as an extension of said shoulder belts, is guided below said at least one seat portion to an entry region thereof; and
        respective tensioning straps yieldingly disposed between said shoulder belts, and front ones of said securement straps that extend on either side of an entry region of said safety seat, in such a way that if said safety belt harness is not strapped on, said shoulders belts are held, under prestress, in an orientation that is parallel to said front securement straps.

2. A safety seat according to claim 1, wherein in the region of said back rest said shoulder belts are joined together to form a central back belt, and wherein said activating means is embodied as an activating belt and is connected to said back belt.

3. A safety seat according to claim 2, wherein a releasable securing device, which serves for fixing said activating belt in position, is disposed in said entry region of said seat portion.

4. A safety seat according to claim 2, wherein said tensioning straps are secured to said shoulder belts, wherein belt deflection means are disposed on front and rear ones of said securement straps, wherein an automatic tensioning device is disposed in the region of said back rest, and wherein said tensioning straps are guided via said belt deflection means to said automatic tensioning device.

5. A safety seat according to claim 4, wherein a further tensioning device is disposed in the region of said back rest, and wherein said shoulder belts or said back belt is connected to said further tensioning device.

6. A safety seat according to claim 5, wherein said tensioning devices are embodied as belt reel-in devices that are provided with a winding spring and a reversible blocking mechanism.

7. A safety seat according to claim 6, wherein said activating means engages both of said belt reel-in devices in such a way that a respective oppositely directed rotational movement of a pertaining belt reel-in shaft is initiated.

8. A safety seat according to claim 7, wherein said belt reel-in devices are coupled with one another via a common shaft that is engaged by said activating means.

9. A safety seat according to claim 8, wherein said activating means is an activating belt that engages said shaft of said belt reel-in devices.

10. A safety seat according to claim 6, wherein said activating means is connected with said blocking mechanism of said belt reel-in devices.

11. A safety seat according to claim 10, wherein said activating means is embodied as a Bowden cable having a switching lever that is disposed on said seat portion.

12. A safety belt according to claim 1, wherein said buckle body and insertion tongue of said belt buckle are secured to ends of said lap belts and are respectively connected to said at least one seat portion via respective adjustment straps, the length of which can be altered.

13. A safety seat according to claim 1, wherein said tensioning straps are comprised of a resiliently yielding material, and wherein ends of said tensioning straps are respectively fixedly secured to said front securement straps and said shoulder belts.

14. A safety seat according to claim 13, wherein said tensioning straps are made of rubber.

15. A safety seat according to claim 1, which is embodied as a textile shell that is tensioned by said securement straps.

* * * * *